United States Patent
Molin et al.

(12)

(10) Patent No.: US 9,377,579 B2
(45) Date of Patent: Jun. 28, 2016

(54) METHOD OF COMPUTING AN EFFECTIVE BANDWIDTH OF A MULTIMODE FIBER

(71) Applicant: Draka Comteq B.V., Amsterdam (NL)

(72) Inventors: Denis Molin, Draveil (FR); Pierre Sillard, Le Chesnay (FR); Marianne Bigot-Astruc, Marcoussis (FR)

(73) Assignee: DRAKA COMTEQ B.V., Amsterdam (NL)

( * ) Notice: Subject to any disclaimer, the term of this patent is extended or adjusted under 35 U.S.C. 154(b) by 795 days.

(21) Appl. No.: 13/652,627

(22) Filed: Oct. 16, 2012

(65) Prior Publication Data

US 2013/0100437 A1    Apr. 25, 2013

(30) Foreign Application Priority Data

Oct. 20, 2011    (EP) ..................................... 11306359

(51) Int. Cl.
*H04B 10/073*    (2013.01)
*H04B 10/2581*    (2013.01)
*G02B 6/028*    (2006.01)
*H04B 10/079*    (2013.01)
*G02B 6/26*    (2006.01)

(52) U.S. Cl.
CPC ............ *G02B 6/0288* (2013.01); *H04B 10/073* (2013.01); *H04B 10/079* (2013.01); *H04B 10/2581* (2013.01); *G02B 6/262* (2013.01)

(58) Field of Classification Search
CPC .......... G01J 5/602; G01J 5/0821; G01J 5/08; G01G 23/37; G01G 23/3735; G01G 23/01; G02B 6/0288; G02B 6/262; H04B 10/073; H04B 10/079; H04B 10/2581

USPC ......................................... 702/102; 356/73.1
See application file for complete search history.

(56) References Cited

U.S. PATENT DOCUMENTS

2010/0028020 A1*    2/2010    Gholami et al. .............. 398/159
2010/0171945 A1*    7/2010    Gholami et al. .............. 356/73.1

FOREIGN PATENT DOCUMENTS

EP             2144096 A1       1/2010

OTHER PUBLICATIONS

European Search Report for EP11306359.8 dated Mar. 28, 2012.
Rick Pimpinella et al: "Correlation of BER Performance to EMBc and DMD Measurements for Laser Optimized Multimode Fiber" Internet Citation Jan. 1, 2007 XP007915802.

\* cited by examiner

*Primary Examiner* — John Breene
*Assistant Examiner* — Lynda Dinh
(74) *Attorney, Agent, or Firm* — Shumaker, Loop & Kendrick, LLP (57) ABSTRACT

A method of assessing the power penalty at a given bit error rate of a multimode fiber including measuring a set of elementary fiber responses corresponding to different offset launches of light over the core radius into the multimode fiber, generating a global fiber response by applying, to the set of elementary fiber responses, a set of weighting coefficients and delays depending on the different offset launches of the elementary fiber responses, and computing a parameter representative of a fiber power penalty from the global fiber response, wherein the set of weighting coefficients includes several subsets of weighting coefficients time delayed relative to one another, wherein at least one relative time delay is not set to zero, and wherein weighting coefficients of each subset depend on the different offset launches of the elementary fiber responses.

14 Claims, 6 Drawing Sheets

METHOD OF COMPUTING AN EFFECTIVE BANDWIDTH OF A MULTIMODE FIBER

TECHNICAL FIELD OF THE INVENTION

The present invention relates to methods of computing an effective bandwidth of a multimode fiber, and more particularly, to methods of computing an effective bandwidth of a multimode fiber including assessing the power penalty at a given bit error rate of the fiber when the fiber is implemented in an optical communication system.

BACKGROUND OF THE INVENTION

Multimode fiber is used in high-speed data networks together with high-speed sources that typically use transversely multimode vertical cavity surface emitting lasers "VCSELs". Historically, bit rates have been limited to 10 Gigabits per second (Gbps) for an Ethernet link and 14 Gbps for a Fiber Channel link, and reach has been limited to less than 400 m, more often less than 100 m.

In order to satisfy constraints of large data centers and comply with the ever increasing demand for bandwidth, such data networks have to cope with chromatic dispersion impairments. Chromatic dispersion impairments depend on the spectral width of the source that is generally transversely multimode, and the larger the spectral width, the larger the chromatic dispersion impairments.

Optical links having a length exceeding 400 m (e.g., 550 m) and working at least at 10 Gbps for spectrally wide VCSELs, and VCSELs operating at 25 or 28 Gbps (which are not yet commercialized), will be more affected by chromatic dispersion than optical links having a short length of about 300 m and working at a bit rate of 10 Gbps. The longer the length of the optical link and the higher the data bit rate, the more the optical link is affected by chromatic dispersion. For optical links with a long length and/or high bit rate, it becomes necessary to mitigate chromatic dispersion. Several options for mitigating chromatic dispersion include using spectrally narrow sources and compensating for chromatic dispersion.

Since spectrally narrow sources (e.g., single or quasi-single mode sources) are costly, compensating for chromatic dispersion within the multimode fiber itself is a more cost-effective approach. Compensation of chromatic dispersion in multimode fibers is partly based on the interaction between the chromatic and the modal dispersions. It has been shown that for perfect alpha ($\alpha$) profiles, multimode fibers exhibiting an alpha slightly below the optimum for a given operating wavelength partially compensate for the chromatic dispersion inherent to the spectral width of typical transversely multimode light sources.

In practice, however, the refractive index profile is not accurately controllable enough to produce only fibers with such a desired feature. As a consequence, a differential mode delay (DMD) measurement is performed on all multimode fibers to assess modal dispersion from which fiber selection is based. It is not feasible, however, to accurately assess the alpha of a fiber from its DMD plot with enough accuracy for this purpose, since in multimode fiber production multimode fibers do not exhibit a perfect alpha profile and generally exhibit complex DMD patterns.

One approach to this problem includes computing an effective modal bandwidth (EMBc). This computation assesses modal bandwidths only, and thus does not assess the bandwidth resulting from the interaction of the chromatic and modal dispersions. Effective modal bandwidth is computed using a weighted sum of the traces recorded for different offset launches over the whole core radius (i.e., the DMD plot), to calculate temporal responses of VCSEL launches. The weight coefficients are called weight function, and each offset launch corresponds to a given weight. One drawback to this approach is that computed effective modal bandwidth is less and less representative of the power penalty at a given bit error rate as the length of optical link and/or data bit rate of the optical link increase.

In another approach described in European application EP2144096, the DMD pattern is modified to partly account for the modal and chromatic dispersion interaction, and effective bandwidth is then computed with this modified DMD pattern using similar weight functions used for EMBc calculations. This second approach works well when multimode fibers are close to perfect alpha and for simple DMD patterns, however, when multimode fibers start to move away from perfect alpha profiles and/or present too complex a DMD pattern, computed effective bandwidth becomes less representative of the power penalty at a given bit error rate.

In a third approach described in US application US2010/0315620, multimode fibers are selected when they exhibit a negative peak delay difference between a first radius and a larger radius. One drawback to this approach is that there are very sensitive measurements and results that are not representative enough of multimode fiber performances, especially when the DMD pattern becomes complex.

BRIEF SUMMARY OF THE INVENTION

Accordingly, an object of the present invention is to alleviate the above-mentioned drawbacks.

In another aspect, the present invention aims to make the computed effective bandwidth more representative of power penalty at a given bit error rate than conventional approaches.

In another aspect, the present invention uses a set of weights, and for each of the weights, there is a delay. Both the weights and their delays are used to build a fiber response and predict system behavior.

In another aspect, the present invention uses at least two sets of weights, each with at least two coefficients that are positive and with associated delays that are different.

According to an embodiment of the invention, to compute a more representative effective bandwidth for multimode fiber, instead of using a single weight function dedicated as a whole to the light launched into the multimode fiber, the single weight function being applied to a DMD plot offset in time, it is proposed to use several different weight functions respectively dedicated to different transverse modes of the light launched into the multimode fiber, each different weight function being applied to a DMD plot offset in time.

The effective bandwidth computed according to an embodiment of the invention is better correlated to system performance, allowing a more accurate and secure multimode fiber selection, depending on features of the optical link, in particular its length and data bit rate. The effective bandwidth computed is much more representative of the power penalty at a given bit error rate with different subsets of weighting coefficients respectively depending on different transverse modes of launched laser light than it would be with a single set of weighting coefficients, a subset of weighting coefficients being a sample of a weighting function.

According to an embodiment of the invention, another parameter representative of fiber power penalty at a given bit error rate, for example the fiber transfer function, can be computed. The multimode fiber can be used in an optical link in an optical system. The introduction of this multimode fiber into an optical system brings with it a penalty in system performance and signal transmission. The computed parameter is representative of this fiber penalty.

A method according to an embodiment of the invention assesses power penalty at a given bit error rate of a multimode fiber, and includes a differential mode delay measurement step including measuring a set of elementary fiber responses corresponding respectively to different offset launches of light over the core radius into the multimode fiber, generating a global fiber response by applying, to the set of elementary fiber responses, a set of weighting coefficients and time delays respectively depending on the different offset launches of the elementary fiber responses, and computing a parameter representative of a fiber power penalty from the global fiber response. The method further includes, in the step of generating a global fiber response, the set of weighting coefficients including several subsets of weighting coefficients being time delayed relative to one another, with at least one relative time delay that is not set to zero, and weighting coefficients of each subset respectively depending on the different offset launches of the elementary fiber responses. The weights are preferably different from each other and at least one of their coefficients is non-zero.

In a further aspect, the computed parameter representative of a fiber power penalty is an effective bandwidth of the multimode fiber.

In a further aspect, each subset of weighting coefficients is applied to the same set of elementary fiber responses to generate a partial fiber response corresponding to only one transverse mode of a laser source.

In a further aspect, a time delay is applied to each partial fiber response corresponding to only one transverse mode of a laser source.

In a further aspect, the global fiber response is built as a sum of the different delayed partial fiber responses.

In a further aspect, the respective time delays are computed as the products of the respective differences between wavelengths (in nm) of a multimode laser source and central wavelength of the laser source multiplied by the chromatic dispersion of the fiber (expressed in ps/nm-km. indeed the chromatic dispersion can also be expressed in $ps^2$/nm). It should be noted that the choice of the reference wavelength, here the central wavelength, is arbitrary, thus one can choose another wavelength since only the delay between mode wavelengths matters.

In a further aspect, weighting coefficients and time delays are chosen such that the spectrum width Root Mean Square of the laser source is more than 0.2 nm, preferably more than 0.3 nm, more preferably more than 0.4 nm, even more preferably more than 0.6 nm.

In a further aspect, the central wavelength of the laser source is in a spectral range of 840 nm-860 nm.

In a further aspect, the difference between the maximal wavelength and the minimal wavelength of the laser source is more than 0.6 nm, preferably more than 1 nm, more preferably more than 1.5 nm.

In a further aspect, a weighting function corresponding to the interpolation, between discreet weighting coefficients, of a subset of weighting coefficients, the areas under the respective weighting functions are respectively proportional to the powers of their corresponding wavelengths of said laser source.

In a further aspect, the set of weighting coefficients includes at least four subsets of weighting coefficients.

In a further aspect, the set of weighting coefficients includes at most ten subsets of weighting coefficients.

In a further aspect, weighting coefficients are obtained through numerical optimization including the iteration of calculation steps, for each transverse mode of launched light corresponding to a subset of weighting coefficients, of a difference between simulated and measured launched light power distribution among fiber modes, performed until minimization of the weighted sum of calculated differences, relative weighting of calculated differences corresponding to relative emitting power of corresponding transverse modes of launched light.

In a further aspect, the representative parameter of fiber penalty is computed several times with different sets of weighting coefficients and associated time delays corresponding to different laser sources, and wherein either the worst computed parameter is kept or the 5 percentile worst parameter is kept.

In a further aspect, fiber selection is made depending on the value of the computed parameter.

In a further aspect, the computed parameter is an effective bandwidth, and fibers are kept that present an effective bandwidth of more than 3000 MHz-km at 850 nm, preferably of more than 3500 MHz-km at 850 nm, more preferably of more than 4000 MHz-km at 850 nm.

In a further aspect, the differential mode delay measurements are performed with a 1 µm step, preferably with a 0.5 µm step.

In a further aspect, the fiber core radius is more than 10 µm, preferably more than 20 µm, more preferably more than 30 µm, even more preferably more than 37 µm.

In a further aspect, the fiber numerical aperture is more than 0.17, preferably more than 0.185, more preferably more than 0.25.

In a further aspect, an additional fiber selection is performed in which only fibers are kept that present an effective modal bandwidth of more than a predetermined threshold.

In a further aspect, an additional fiber selection is performed in which only fibers are kept that present an effective modal bandwidth of more than 4700 MHz-km at 850 nm.

According to some embodiments of the invention, the weighting coefficients are all zero or positive, and the sum of each subset is positive.

BRIEF DESCRIPTION OF THE DRAWINGS

Further features and advantages of the invention will appear from the following description of embodiments of the invention, given as non-limiting examples, with reference to the accompanying drawings in which.

DETAILED DESCRIPTION OF THE INVENTION

Figure 1:
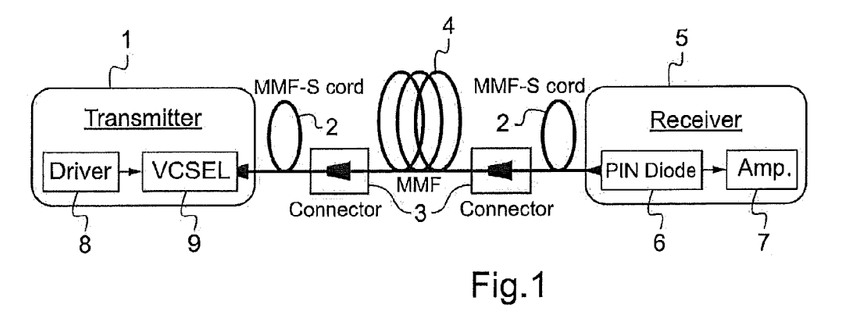
FIG. 1 shows an example of an optical communication system including a multimode fiber.

FIG. 1 shows an example of an optical communication system including a multimode fiber. A multi Gigabits Ethernet optical communication system successively comprises a driver 8 of a transmitter 1, a VCSEL source 9 of a transmitter 1, a launch cord 2, a connector 3, a multimode fiber 4 object of the present effective bandwidth computing method, a connector 3, a launch cord 2, a PIN diode 6 of a receiver 5, and an amplifier 7 of a receiver 5. A digital signal at 10 Gbps or 25 Gbps is generated by the driver 8 that directly modulates the VCSEL source 9.

Figure 2:
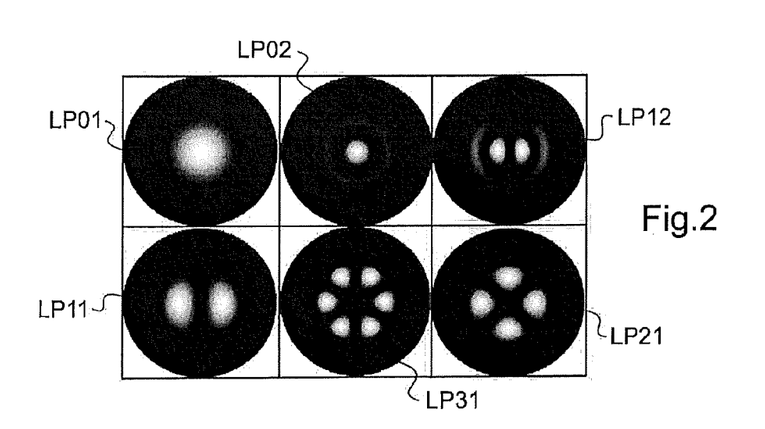
FIG. 2 shows an example of the intensity profile of different modes of a vertical cavity surface emitting laser source.

FIG. 2 shows an example of the intensity profile of different modes of a vertical cavity surface emitting laser source. Such a high-speed VCSEL source 9, as in FIG. 1, is typically transversely multimode and longitudinally single mode. Here, six different transverse modes, among most relevant modes because of the high proportion of the total laser source power they contain, are represented. There is an LP01 transverse mode, LP11 transverse mode, LP21 transverse mode, LP02 transverse mode, LP31 transverse mode, and LP12 transverse mode.

As a consequence, each VCSEL mode will excite different fiber modes when coupled to a multimode fiber. This excitation can be mathematically described by an expansion as follows:

$$\psi_i^{VCSEL} = \sum_k a_{i,k} \psi_k^{fiber} + \text{Loss}$$

which is equation 1, where $\psi_i^{VCSEL}$ and $\psi_k^{fiber}$ are the $i^{th}$ and $k^{th}$ mode of respectively the VCSEL source 9 and the multimode fiber and $|a_{i,k}|^2$ is the coupled power of the $i^{th}$ VCSEL mode into the $k^{th}$ fiber mode.

Figure 3:
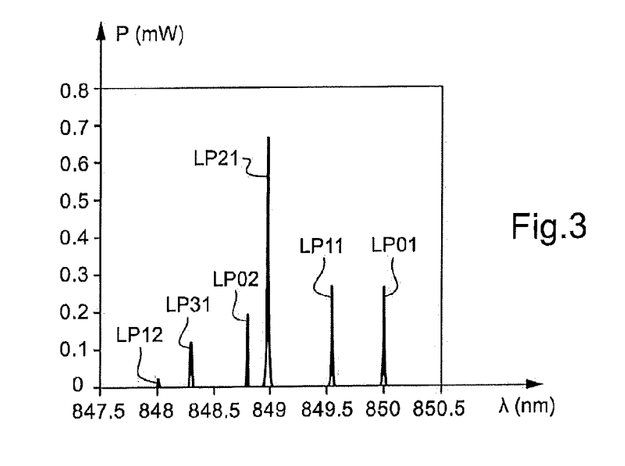
FIG. 3 shows an example of an optical spectrum of a vertical cavity surface emitting laser source.

FIG. 3 shows an example of the optical spectrum of a vertical cavity surface emitting laser source. The distributed power P, expressed in mW, is plotted as a function of the wavelength λ, expressed in nm. Each VCSEL transverse mode exhibits its own wavelength. As a consequence, the optical spectrum of the VCSEL is discrete such as represented in FIG. 3. In this example, most power is emitted through the LP21 transverse mode. Intermediate levels of power are distributed in LP11 transverse mode, in LP01 transverse mode and in LP02 transverse mode. Lower levels of power are distributed in LP31 transverse mode and in LP12 transverse mode.

Since VCSEL modes share the same gain, each VCSEL mode carries its own optical signal $s_i(t)$ despite being excited by the same electrical signal of the driver 8. For sake of convenience, the effect of the connectors can be neglected since all fibers, launch cords 2 and multimode fiber 4, in the link exhibit similar refractive index profile and since the connectors 3 can be considered as ideal.

Under this assumption, the optical wave excited by the $i^{th}$ VCSEL mode then travels through the fiber and is affected by the modal ($\beta_1$) and the chromatic ($\beta_2$) dispersion and attenuation α. The output electromagnetic field $\psi_{out}$ can be expressed as follows:

$$\vec{\psi}_{out}(\omega) = \sum_k a_{i,k} \cdot \tilde{H}_k(\omega, L) \cdot \tilde{s}_i(\omega) \cdot \vec{\psi}_k^{fiber}$$

which is equation 2, where, $\omega=2\pi c/\lambda$ and $\omega_i=2\pi c/\lambda_i$, $\lambda_i$ is the wavelength of the $i^{th}$ VCSEL mode, and L is the fiber length, $\tilde{s}_i$ is the Fourier transform of $s_i$, and $\tilde{H}_k(\omega, L)$ is the transfer function of the k-th fiber mode.

$$\tilde{H}_k(\omega, L) = e^{-\frac{\alpha_k \cdot L}{20}} \cdot e^{-\frac{\alpha_{k,BL}}{20}} \cdot e^{-i\beta_{k,0}L} \cdot e^{-i\beta_{k,1}\cdot(\omega-\omega_0)\cdot L} \cdot e^{-i\frac{\beta_{k,2}}{2}\cdot(\omega-\omega_0)^2 \cdot L}$$

where $\alpha_k$ is the linear attenuation of the k-th mode in dB/km, L the fiber length in km, $\alpha_{k,BL}$ is the indicental loss applied to the k-th mode (that can be bending loss), $\beta_{k,0}$ is the propagation constant, $1/\beta_{k,1}$ is the group velocity and $\beta_{k,2}$ is the group velocity dispersion of the k-th mode at $\lambda_i$.

Therefore, the optical wave that reaches the output of the fiber can be expressed as follows:

$$|s_i^{output}(t)|^2 = \sum_k |a_{i,k}|^2 \cdot |s_i(t + \beta_1^k(\omega_i) \cdot L)|^2$$

which is equation 3. If the effect of chromatic dispersion in equation 2 is neglected, since each VCSEL mode is spectrally narrow, and if the attenuation coefficient is neglected for sake of simplicity, knowing that a quadratic detector is used and that the detector area is sufficiently large so that the overlapping integral between fiber modes on the detector surface is 0 if modes are different:

$$\iint_{detector} \psi_i \cdot \psi_j^* \cdot dS = \begin{cases} 0 & \text{if } i \neq j \\ 1 & \text{if } i = j \end{cases}$$

The total signal is thus equal to the sum of all signals. So it can be derived:

$$|s^{output}(t)|^2 = \sum_i |s_i^{output}(t)|^2$$

which is equation 3.

Therefore:

$$|s^{output}(t)|^2 = \sum_i \sum_k |a_{i,k}|^2 \cdot |s_i(t + \beta_1^k(\omega_i) \cdot L)|^2$$

knowing that $$\beta_1^k(\omega_i) \approx \beta_1^k(\omega_0) + \frac{\beta_2^k(\omega_0)}{2}(\omega_i - \omega_0)$$

where $\omega_0$ is the pulsation of the center wavelength of the spectrum and that the chromatic dispersion is the same for all the fiber modes:

$$\beta_2^k \approx \beta_2$$

it comes:

$$|s^{output}(t)|^2 = \sum_i \sum_k |a_{i,k}|^2 \cdot \left| s_i\left(t + \beta_1^k(\omega_0) \cdot L + \frac{\beta_2(\omega_0)}{2}(\omega_i - \omega_0) \cdot L\right)\right|^2$$

the delay to apply inside $s_i$ is therefore divided in two parts:
the first relative to the modal dispersion only: $\beta_1^k(\omega_0)$
the second relative to the chromatic dispersion only:

$$\frac{\beta_2(\omega_0)}{2}(\omega_i - \omega_0)$$

The idea of the invention consists in providing $|a_{i,k}|^2$, through a the family of weight functions, and associated delays $$\tau_i = \frac{\beta_2(\omega_0)}{2}(\omega_i - \omega_0).$$

$\beta_1^k(\omega_0)$ define the modal dispersion assessed by the DMD plot as explained below.

Finally, the transfer function $H(\omega)$ of the multimode fiber under VCSEL excitation can be defined as follows:

$$|H(\omega)|^2 = \frac{|\tilde{s}_{out}(\omega)|^2}{|\tilde{s}_{in}(\omega)|^2}$$

$$= \frac{\sum_i \sum_k |a_{i,k}|^2 \cdot e^{-j(\beta_1^k(\omega_0) \cdot L + \tau_i \cdot L)\omega}}{\sum_i \sum_k |a_{i,k}|^2}$$

$$= \frac{1}{\sum_i \sum_k |a_{i,k}|^2} \cdot \sum_i \left( \sum_k |a_{i,k}|^2 \cdot e^{-j(\beta_1^k(\omega_0) \cdot L)\omega} \right) \cdot e^{-j(\tau_i \cdot L)\omega}$$

which is equation 4,
from which a bandwidth at −3 dB can be computed that is called effective bandwidth.

$$|H(\omega)|^2 = \frac{\sum_i \sum_k |a_{i,k}|^2 \cdot e^{-j(\beta_1^k(\omega_0) \cdot L + \tau_i \cdot L)\omega}}{\sum_i \sum_k |a_{i,k}|^2}$$

Figure 4A:
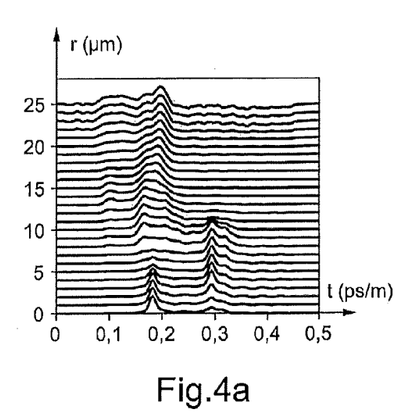
FIGS. 4a and 4b show examples of measured DMD plots for different multimode fibers.
Figure 4B:
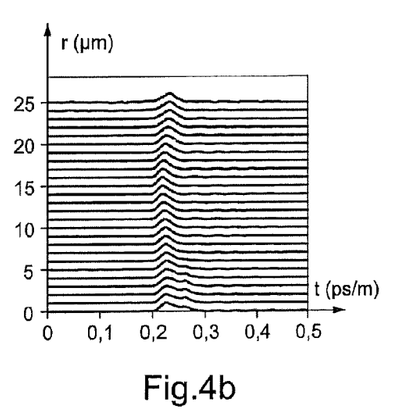

FIGS. 4a and 4b respectively show examples of measured DMD plots for two different multimode fibers. The fiber response obtained with an offset launch r, that is to say the distance from multimode fiber core center where the light is launched into multimode fiber core, expressed in μm, is plotted as a function of time t, expressed typically in ns (and eventually in ps/m when normalized by the fiber length). The differential mode delay measurement is a way of characterizing the modal properties of multimode fibers, in providing cartography of the modal dispersion. It is now widely used by fiber manufacturers to assess performances of fibers dedicated to high-speed networks operating at 10 Gbps and using VCSEL sources. DMD measurements are performed according to normalized procedures IEC 60793-1-49 & TIA-FOTP-220. Developed for the characterization of 50 μm multimode fibers, this measurement method can be straightforwardly extended to any multimode fibers, especially with larger or narrower core size and or different numerical apertures.

An example of DMD measurement at 850 nm is shown in FIGS. 4a and 4b, for two different multimode fibers with a core radius of 50 μm. DMD provides cartography of the modal dispersion across the multimode fiber radius. Indeed, each line on this plot corresponds to the power evolution as a function of time when a short laser pulse (20 ps to 1 ns) is launched, through a single mode fiber with 5 μm mode field diameter at 850 nm, at one specific position across the multimode fiber radius, called the offset launch on the graph.

The fiber response $H_r^{DMD}$ for each offset launch can be expressed as follows:

$$H_r^{DMD}(\omega) = \sum_k b_{r,k} \cdot \tilde{H}_k(\omega, L)$$

which is equation 5, where $|b_{r,k}|^2$ is the coupled power within the $k^{th}$ mode of the multimode fiber by the offset launch r during the DMD measurements.

Then weighting coefficients are introduced through parameters $W(r,i)$ and $\tau_i$ to build a global fiber response from the DMD measurements:

$$H^{DMD}(\omega, \{W\}, \{\tau\}) = \sum_i \sum_r \sqrt{W(r,i)} \cdot e^{-j\tau_i \omega} \cdot H_r^{DMD}(\omega)$$

which is equation 6.

Weighting coefficients parameters $W(r,i)$ are chosen such as:

$$\sum_r W(r,i) \cdot |b_{r,k}|^2 = |a_{i,k}|^2$$

which is equation 7, and $\tau_i$ such as:

$$\tau_i - \beta_1^1(\omega_{mes}) \approx \beta_1^1(\omega_i) - \beta_1^1(\omega_1) \approx \frac{\beta_2(\omega_0)}{2}(\omega_i - \omega_0)$$

which is equation 8.

Therefore, equation 6 is equivalent to equation 4.

Each $k^{th}$ fiber mode exhibits its own modal ($\beta_1^k$) and chromatic ($\beta_2^k$) dispersion that are related to the time delay $\tau(\lambda_0)$ expressed in m·s$^{-1}$ and $C(\lambda_0)$ expressed in ps/nm·km and computed at $\lambda_0$, typically the center wavelength of the VCSEL optical spectrum. It comes:

$$\beta_1^k(\lambda) = \tau(\lambda_0) + (\lambda - \lambda_0) \cdot 10^{-9} \cdot C(\lambda_0) \cdot 10^{-6}$$

which is equation 9, and $$\beta_2^k(\lambda) \approx -C(\lambda_0) \cdot 10^{-6} \cdot \frac{(\lambda_0 \cdot 10^{-9})^2}{2\pi c}$$

which is equation 10, when the wavelengths are expressed in nm, and c is the speed of light in m·s⁻¹.

Finally, $$\tau_i \approx 1000 \cdot C(\lambda_0) \cdot (\lambda_i - \lambda_0) + cst$$

where $\tau_i$ is expressed in ps/m, C in ps/nm-km, and $\lambda_0$ and $\lambda_i$ in nm.

Figure 5:
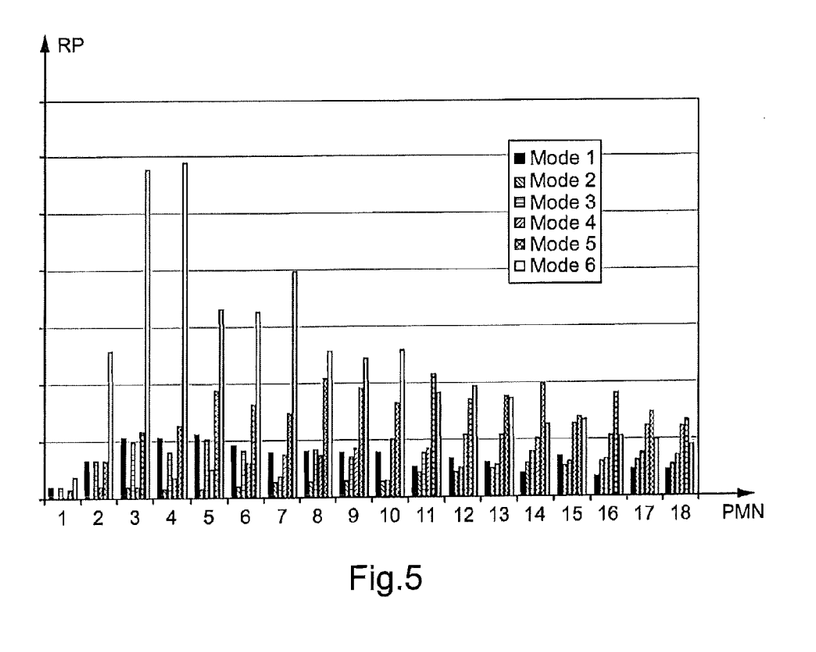
FIG. 5 shows an example of fiber mode power distribution induced by different modes of a vertical cavity surface emitting laser source.

FIG. 5 shows an example of fiber mode power distribution induced by different modes of a vertical cavity surface emitting laser source. It is convenient to model multi Gigabit transmission systems and DMD measurements. Here, the transmission at a data bit rate of 10 Gbps over a link length of 300 m of a plurality of multimode fibers with a given transceiver has been modeled. The power distribution of the six different modes of the laser source within the eighteen groups of the multimode fiber is shown in FIG. 5. Relative power RP is expressed as a function of the multimode fiber mode group number, also called principal mode number PMN, for each of the six different modes of laser source.

Figure 6:
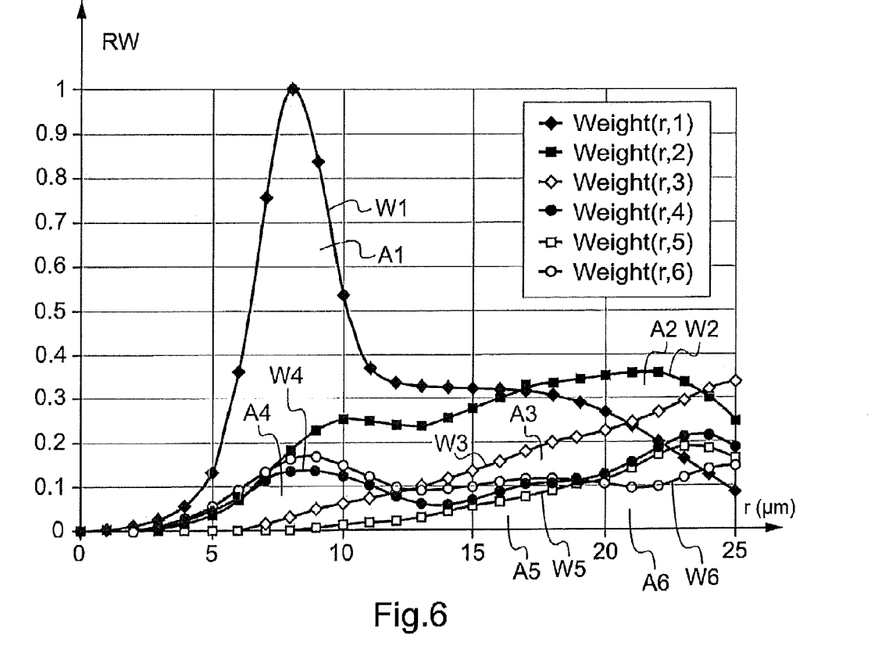
FIG. 6 shows an example of a family of weighting functions representative of the fiber mode power distribution induced by the different modes of a vertical cavity surface emitting laser source of FIG. 5.
Figure 7A:
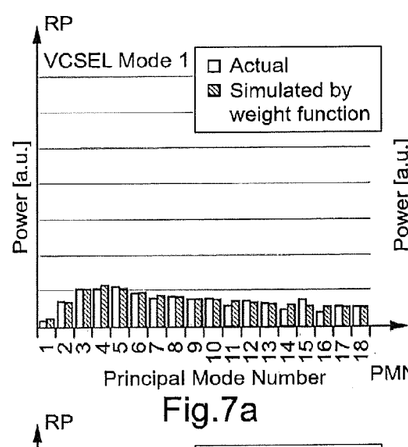
FIGS. 7a-7f show examples of comparisons between an actual fiber mode power distribution and a fiber mode power obtained with weighting functions of FIG. 6, for six modes of a vertical cavity surface emitting laser source.
Figure 7B:
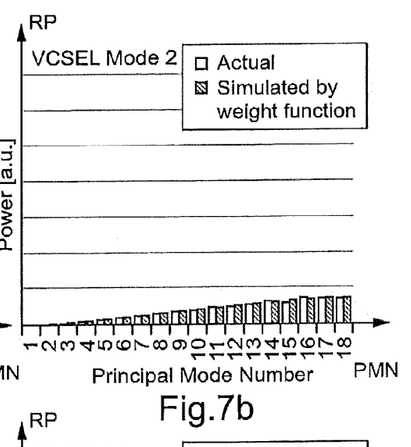
Figure 7C:
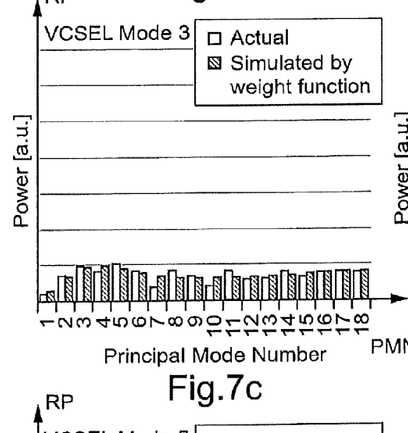
Figure 7D:
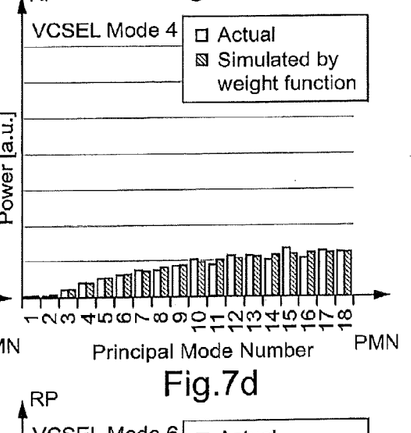
Figure 7E:
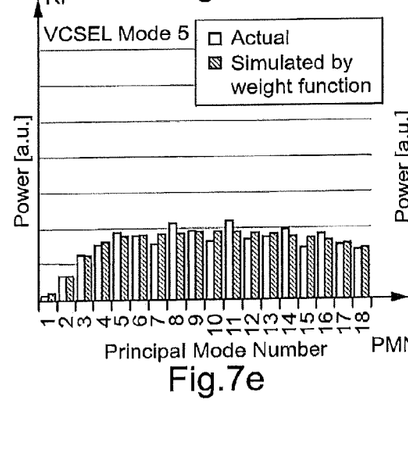
Figure 7F:
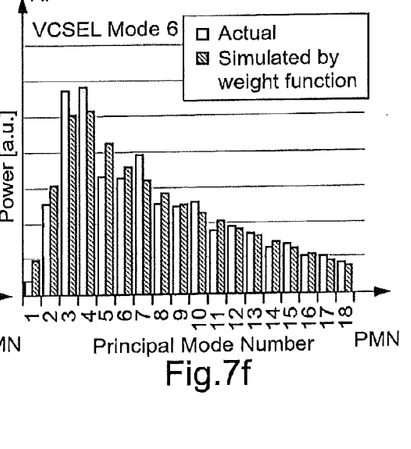

FIG. 6 shows an example of a family of weighting functions representative of the fiber mode power distribution induced by the different modes of a vertical cavity surface emitting laser source of FIG. 5. These weighting functions actually minimize $$\sum_k \left| \sum_r W(r, i) \cdot |b_{r,k}|^2 - |a_{i,k}|^2 \right|^2 \forall i$$

assuming $W(r,i) \geq 0$. This minimization can be performed using well-known algorithms like the least square method.

The relative weight RW of each weighting function is plotted as a function of the offset launch r expressed in μm. The VCSEL excitation can be approximated by several different weight functions W(r, i) represented in FIG. 6, one weight function per transverse mode of launched light, and a list of delays $\tau_i$ reported in table 1.

TABLE 1

| $\tau_i$ (ps/m) | 0 | 0.034 | 0.077 | 0.09 | 0.128 | 0.15 |
|---|---|---|---|---|---|---|

These weight functions reproduce well the VCSEL excitation as shown in FIG. 6 that reports the mode power distribution actually induced by each VCSEL mode and the mode power distribution obtained by the weighted sum of offset launch excitation during the DMD measurements.

Each weighting function W(r, 1) to W(r, 6) (also called W1 to W6) are discreet weighting coefficients, of a subset of weighting coefficients, the respective sums of W(r, 1) to W(r, 6) are respectively proportional to the powers of their corresponding transverse modes 1 to 6 of light launched into multimode fiber by laser source. FIGS. 7a-7f show examples of comparisons between a measured fiber mode power distribution and a fiber mode power simulated with the weighting functions of FIG. 6, for six modes of a vertical cavity surface emitting laser source. Relative power RP is expressed as a function of the multimode fiber mode group number, also called principal mode number PMN, for each of the six different modes of laser source. Measured and simulated power distributions are very close to each other, and that is true for all six different modes of laser source.

To compute the effective bandwidth requires:
first the temporal response corresponding to each VCSEL mode is computed $$S_i(t) = \sum_r W(r, i) \cdot s_r(t)$$

where $s_r$ are the temporal responses recorded for each offset launch during the DMD measurements, $s_{0_{\mu m}}$ is the center launch, $s_{1_{\mu m}}$ with a 1 μm offset, ...

second a temporal delay between all VCSEL modes is applied
$S_i(t-\tau_i)$ if $\tau_i > 0$, the $(t, S_i(t))$ curve is shifted to the right
the i VCSEL mode responses are summed to get a VCSEL mode response $$\sum_i S_i(t - \tau_i)$$

the −3 dB bandwidth of the transfer function which is finally computed is defined as follows:

$$H(\omega) = \frac{TF\left(\sum_i S_i(t - \tau_i)\right)}{TF(S_{Pulse}(t))}$$

where $S_{pulse}$ is the reference pulse used for the DMD measurements.

As far as experimental conditions are concerned, bit error rate measurements have been performed on real fibers. The weighting functions and the associated weighting coefficients have been derived theoretically for a given VCSEL based source exhibiting a similar encircled flux and spectral width. The weighting functions are reported in FIG. 6 in and the delays $\tau_i$ in table 1.

$R^2$ is the correlation coefficient between measured and fitted values assuming a power law ($y = ax^b$).

Figure 8A:
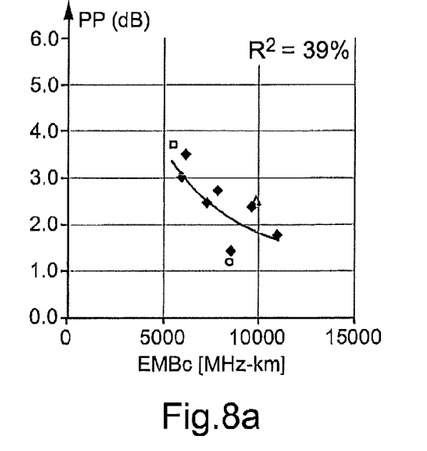
FIGS. 8a-8d show examples of comparisons between on one side a measured correspondence between power penalty at a given bit error rate and minimum effective modal bandwidth on FIG. 8a, effective bandwidth according to an embodiment of the invention on FIG. 8b, effective bandwidth computed according to the prior art in FIG. 8c, and peak delays of the prior art in FIG. 8d, at a data bit rate of 10 Gbps for a link length of 550 m.
Figure 8B:
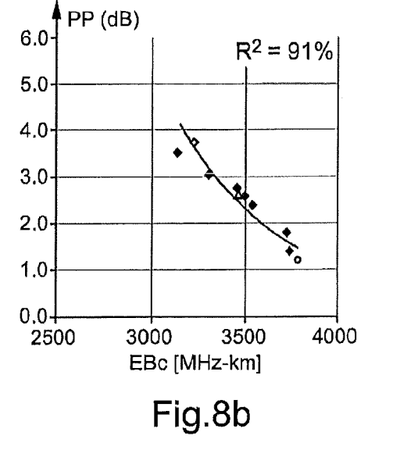
Figure 8C:
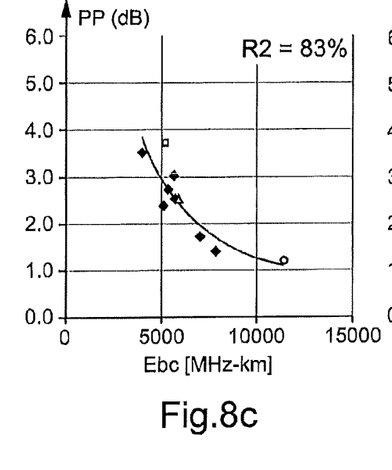
Figure 8D:
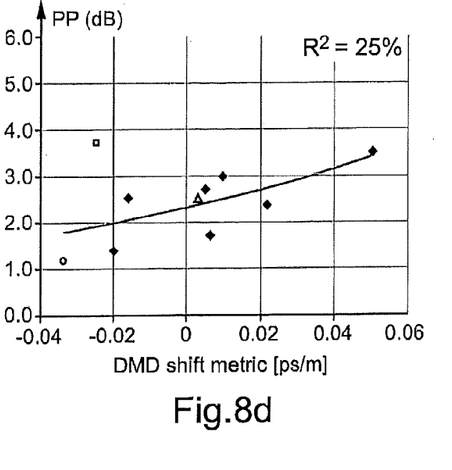

FIGS. 8a-8d show examples of comparisons between on one side a measured correspondence between power penalty at a given bit error rate and minimum effective modal bandwidth on FIG. 8a, effective bandwidth on FIG. 8b, effective bandwidth computed according to the prior art in FIG. 8c, and peak delays of the prior art in FIG. 8d, at a data bit rate of 10 Gbps for a link length of 550 m.

At 10 Gbps, an 83% correlation for the best prior art can be seen compared to a 91% correlation for an embodiment according to the present invention. Thus, the present invention clearly shows a better correlation between measured and simulated values than the prior art.

FIG. 8a shows a 39% correlation for the prior art method, which is much lower than the 91% correlation of the method according to the present invention shown in FIG. 8b.

FIG. 8c shows an 83% correlation for a second prior art method, which is not as good as the 91% correlation of the method according to the present invention.

FIG. 8d shows a 25% correlation for a third prior art method, which is much lower than the 91% correlation of the method according to present invention.

Figure 9:
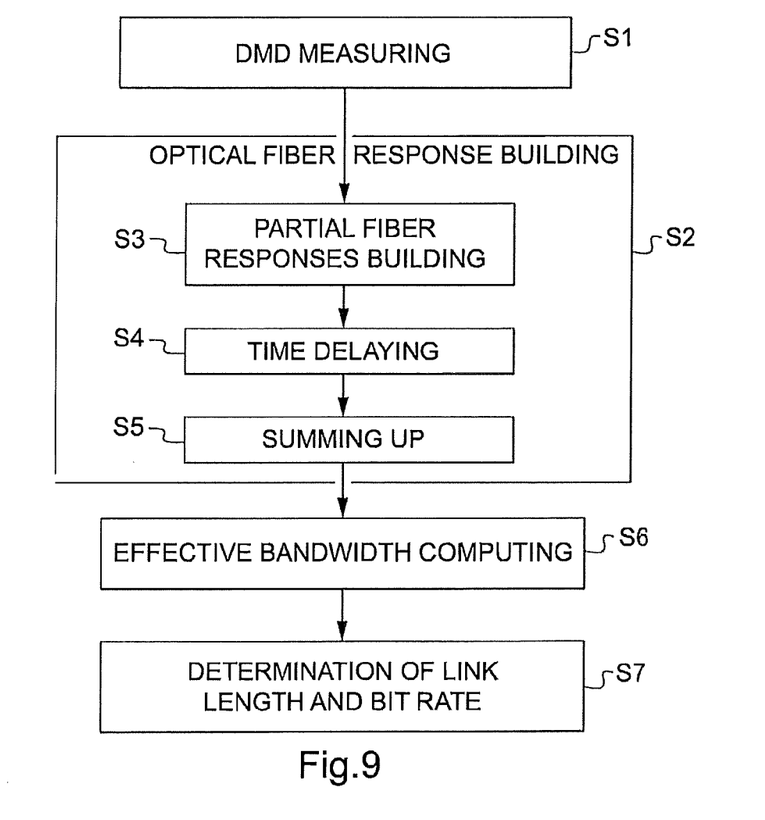
FIG. 9 shows an example of the different steps and substeps performed by an effective bandwidth computation method according to an embodiment of the invention.

FIG. 9 shows an example of the different steps and substeps performed by an effective bandwidth computation method according to an embodiment of the invention. The computing method comprises a step S1 of DMD measuring, a step S2 of global fiber response building, itself subdivided in three substeps S3 of partial fiber responses building, S4 of delaying partial responses to one another, and S5 of summing up delayed partial responses, a step S6 of effective bandwidth computing, and a step S7 of link length and data bit rate determination. In step S1, a differential mode delay measurement is performed for the multimode fiber. A set of elementary fiber responses corresponding respectively to different offset launches of light into multimode fiber is measured. Laser light is launched from the output of a single mode fiber to the input of the multimode fiber to be characterized, at different distances from the center of the multimode fiber core.

In step S2, a global fiber response is built by performing successively the three substeps S3, S4 and S5. Therefore, in a preferred option, in a substep S3, each subset of weighting coefficients is applied, to the same set of elementary fiber responses, to build a partial fiber response corresponding to only one transverse mode of launched light. In a substep S4, different temporal delays are implemented between the partial responses. In a substep S5, the global fiber response is built as the sum of the delayed partial responses. All three functional operations of building of partial fiber responses, of delaying and of summing up delayed partial responses to build global fiber response can be done in one single calculation. In step S6, the effective bandwidth is computed from the global fiber response. In step S7, a multi gigabits optical communication link, for example an Ethernet optical communication link, whose length and bit rate depend on the computed effective bandwidth is determined. The higher the computed effective bandwidth is, the longer the link length and the higher the bit rate are. Afterwards, the multimode fiber can be included in the multi gigabits Ethernet optical communication link, whose length and bit rate depend on the computed effective bandwidth.

Step S2 can be computed for a plurality of multi-subsets weighting functions in order to account for a plurality of VCSEL types leading to as many effective bandwidths in step S6. Then, a reasonable worst case effective bandwidth, like the minimum effective bandwidth or a 5% fractile can be used to guarantee safe transmissions for a given length and bit rate multi-gigabits optical link.

Figure 10:
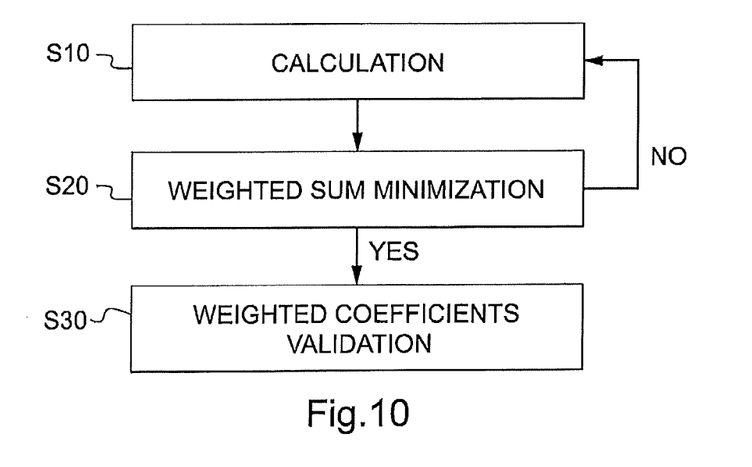
FIG. 10 shows an example of the different steps performed to determine the weighting coefficients used by an effective bandwidth computation method according to an embodiment of the invention.

FIG. 10 shows an example of the different steps performed to determine the weighting coefficients used by an effective bandwidth computation method according to an embodiment of the invention. Weighting coefficients are obtained through numerical optimization including the iteration of calculation steps S10, for each transverse mode of launched light corresponding to a subset of weighting coefficients, of a difference between simulated and measured launched light power distribution among fiber modes, performed until minimization of weighted sum of calculated differences, relative weighting of calculated differences corresponding to relative emitting power of corresponding transverse modes of launched light. The mode power distribution induced by each VCSEL mode excitation or by the offset launches during the DMD measurements within the fiber can be derived exclusively by modeling assuming or derived from near fields measurements.

In step S20, if the weighted sum is acknowledged as minimal, the method proceeds to step S30 where the complete set of subsets of weighting coefficients is validated to be used in the effective bandwidth computing method according to the invention. In step S20, if the weighted sum is not acknowledged as minimal, then the method goes back to step S10.

In calculation step S10, one or more of the following rules are preferably respected. One rule is that, a weighting function corresponding to the extrapolation, between discreet weighting coefficients, of a subset of weighting coefficients, the surfaces under the respective weighting functions are respectively proportional to the powers of their corresponding transverse modes of launched light. Another rule is that, the different subsets of weighting coefficients are time shifted to one another, time shifts of the different subsets respectively depending on the different fiber modal dispersions at the different wavelengths of the different transverse modes of launched light. Still another rule is that relative emitting power of different transverse modes of launched light is determined by an average of several different vertical cavity surface emitting laser sources, preferably by an average of at least five different sources, more preferably by an average of at least ten different sources.

The number of different modes of the launched light into the multimode fiber which are taken into account for determining weighting coefficients depends on the number of VCSEL modes actually dominant under operation, meaning the number of VCSEL modes that emit the main part of the power. The methods of the present invention can use as many weight functions as there are VCSEL modes. This number can vary from two up to eight typically, but may exceed eight, leading to as many subsets in the weight functions. More preferably, several families of weighting functions and associated delays can be used to account for a plurality of VCSELs, with a particular attention paid to the minimum or the median effective bandwidth.

Without intending to limit the scope of the present invention, as described above the present invention uses a set of weights, and for each of these weights there is a delay. Both the weights and the delays can be used to build a fiber response and predict the behavior of the system. In order to account for chromatic and modal dispersion interaction when the fiber is used with a multimode laser source, the present invention deals with weights and associated delays such as, at least two sets of weights are used (to distinguish from EMBc), each set of weights having at least two coefficients that are (strictly) positive (to distinguish from EBc), and each of these weights having associated delays that are different from each other (to distinguish from EMBc).

The invention has been described with reference to preferred embodiments. However, many variations are possible within the scope of the invention.

What is claimed is:
1. A method of assessing chromatic and modal dispersions in a multimode fiber for assessing a fiber power penalty at a given bit error rate of the multimode fiber to predict multimode fiber behavior in an optical communication system, the method comprising:
providing the multimode fiber and an artificial light source before a first step;
applying artificial light from the artificial light source to the multimode fiber before the first step;
the first step of measuring differential mode delay by utilizing a test machine to measure a set of elementary fiber responses corresponding respectively to different offset launches of the artificial light over a core radius into the multimode fiber;
a second step of generating a global fiber response by applying, to the set of elementary fiber responses, a set of weighting coefficients and time delays respectively depending on the different offset launches of the elementary fiber responses; and a third step of computing a parameter representative of the fiber power penalty from the global fiber response;

wherein, in the second step of generating a global fiber response, the set of weighting coefficients includes several subsets of weighting coefficients that are time delayed relative to one another, wherein at least one relative time delay is not set to zero, and wherein the weighting coefficients of each subset respectively depend on the different offset launches of the elementary fiber responses, wherein fiber selection is made based on the computed parameter being at least an effective bandwidth and the fiber selection includes fibers having the effective bandwidth between 3000 MHz-km and 6000 MHz-km at 850 nm; and wherein the method achieves a correlation between predicted values and actual values of the multimode fiber in the optical communication system.

2. The method according to claim 1, wherein the computed parameter representative of a fiber power penalty is an effective bandwidth of the multimode fiber.

3. The method according to claim 1, wherein:

each subset of weighting coefficients is applied, to a same set of elementary fiber responses, to generate a partial fiber response corresponding to only one transverse mode of a laser source;

a time delay is applied to each partial fiber response corresponding to only one transverse mode of a laser source; and the global fiber response is built as a sum of a different delayed partial fiber responses.

4. The method according to claim 1, wherein respective time delays are computed as products of the respective differences between wavelengths of a laser source and central wavelength of the laser source multiplied by the chromatic dispersion of the fiber.

5. The method according to claim 4, wherein weighting coefficients and time delays are such that a spectrum width Root Mean Square (RMS) of the laser source is more than 0.2 nm.

6. The method according to claim 4, wherein a difference between a maximum wavelength and a minimum wavelength of the laser source is more than 0.6 nm.

7. The method according to claim 4, wherein a weighting function corresponding to the interpolation, between discreet weighting coefficients, of a subset of weighting coefficients, areas under the respective weighting functions are respectively proportional to powers of their corresponding wavelengths of the laser source.

8. The method according to claim 1, wherein the set of weighting coefficients includes at least four subsets of weighting coefficients.

9. The method according to claim 1, wherein the set of weighting coefficients includes at most ten subsets of weighting coefficients.

10. The method according to claim 1, wherein weighting coefficients obtained through numerical optimization including an iteration of calculation steps, for each transverse mode of launched light corresponding to a subset of weighting coefficients, of a difference between simulated and measured launched light power distribution among fiber modes, performed until minimization of weighted sum of calculated differences, relative weighting of calculated differences corresponding to relative emitting power of corresponding transverse modes launched light.

11. The method according to claim 1, wherein the differential mode delay measurements are performed with a 1 μm step.

12. The method according to claim 1, wherein a fiber core radius is more than 10 μm.

13. The method according to claim 1, wherein an additional fiber selection is performed in which only fibers are kept that present an effective modal bandwidth of more than a predetermined threshold.

14. The method according to claim 13, wherein an additional fiber selection is performed in which only fibers are kept that present an effective modal bandwidth of more than 4700 MHz-km at 850 nm.

* * * * *